April 7, 1964  F. P. ZIERDEN  3,127,802
LATHE TOOL HOLDER
Filed Sept. 17, 1959  3 Sheets-Sheet 2

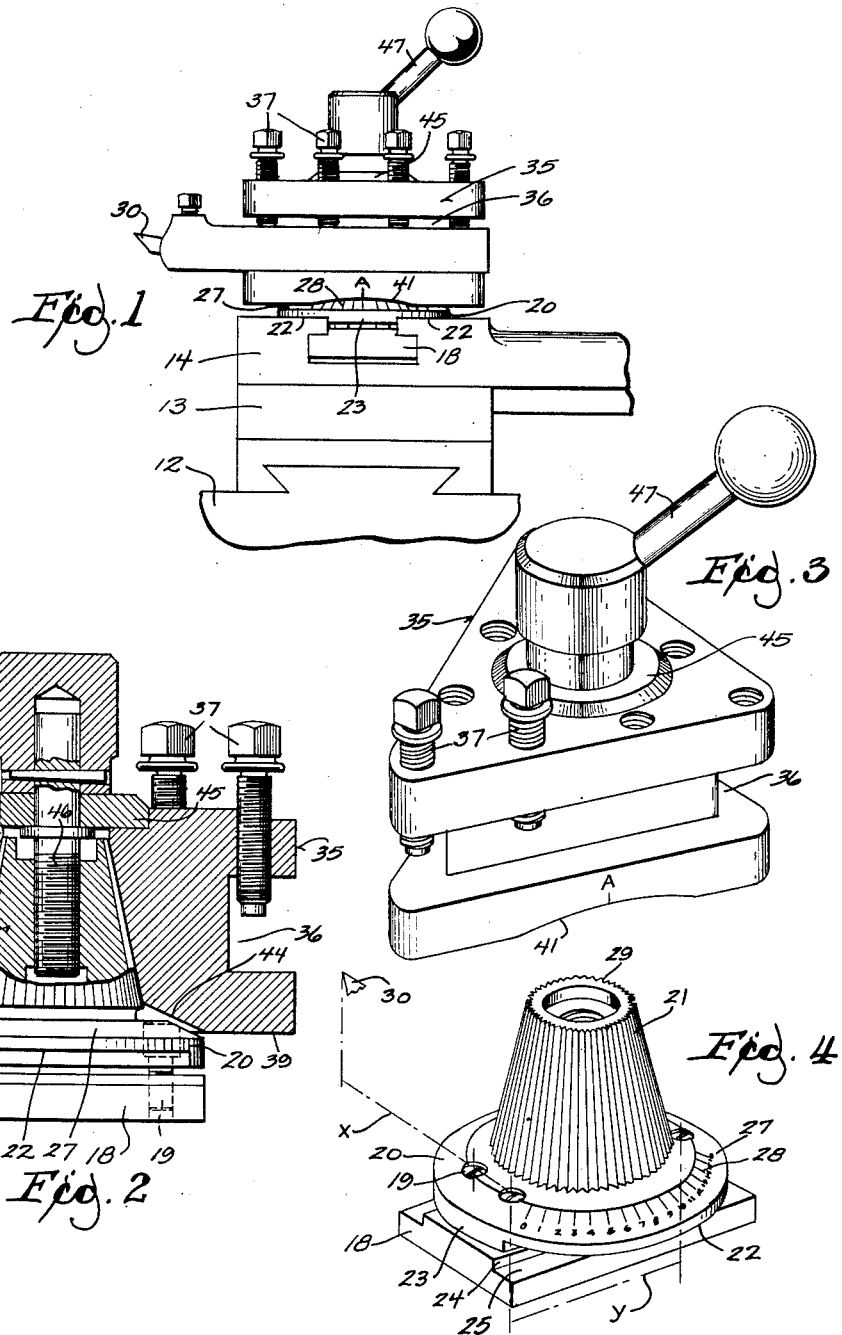

INVENTOR.
FRANK P. ZIERDEN
BY
Miles Henninger
ATTORNEY

April 7, 1964      F. P. ZIERDEN      3,127,802
LATHE TOOL HOLDER
Filed Sept. 17, 1959      3 Sheets-Sheet 3
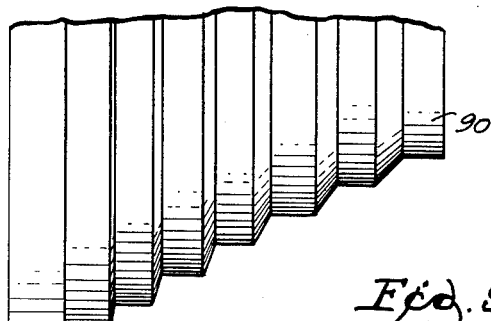
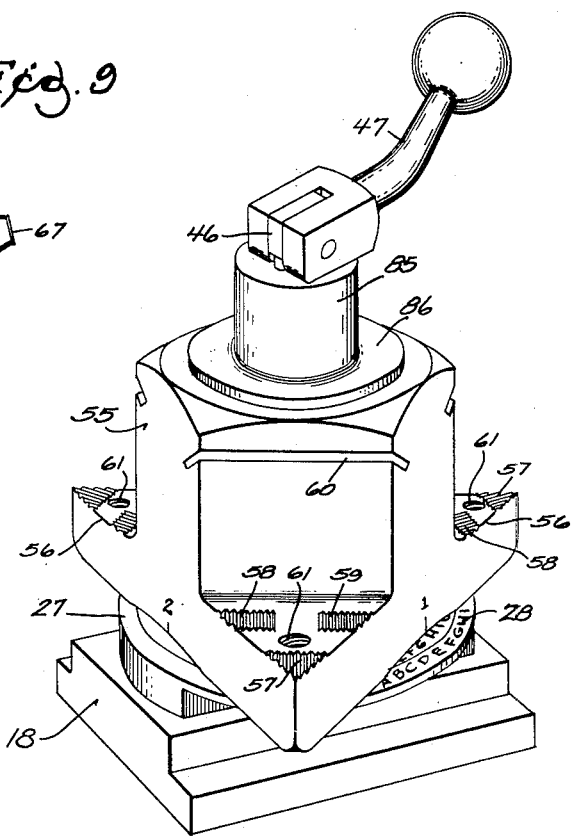
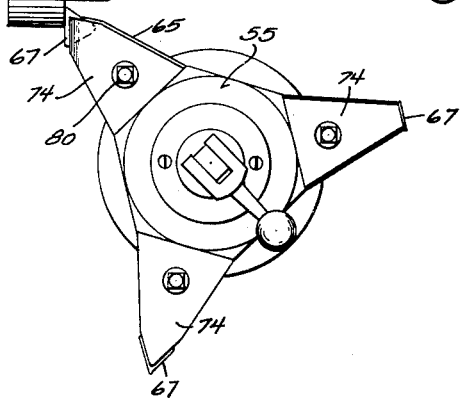
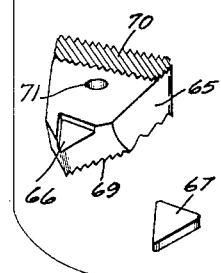
INVENTOR.
FRANK P. ZIERDEN
BY *Miles Henninger*
ATTORNEY

United States Patent Office 3,127,802
Patented Apr. 7, 1964

3,127,802
LATHE TOOL HOLDER
Frank P. Zierden, 3709 E. Allerton Ave., Cudahy, Wis.
Filed Sept. 17, 1959, Ser. No. 840,783
3 Claims. (Cl. 82—36)

This invention relates to improvements in means for holding cutting tools in adjustable but firm position on machine tools such as lathes.

Tool-holders are known for use with engine-type lathes in which the holders may receive and retain a number of tools and in which the holder may be swiveled to present any one of such tools to the workpiece. None of such holders have heretofore given adequate rigidity for satisfactory use with cemented carbide-tipped tools while retaining the possibility of adjustment and of interchange of parts of the tool-holder for another and similar tool-holder part on which other tools have been set in a particular way for work on a given workpiece. Further, such tool-holders have not provided adequate means for holding tools using cemented carbide tips of the type providing a plurality of cutting edges to be successively brought into use when one cutting edge is damaged. Thus, cutting tips need not be ground to provide new cutting edges and are discarded when all of the cutting edges are damaged.

In the drawings:

FIGURE 1 is a fragment of the usual carriage, cross-slide and tool-slide of a lathe of the so-called engine type, with one embodiment of a tool-holder in place thereon and with a tool fixed in the tool-holder;

FIGURE 2 is a cross-section on a longitudinal central plane through one embodiment of the tool-holder;

FIGURE 3 is a perspective view of a tool-holder head portion of triangular form for seating on the base portion of the present unit and for holding a number of cutting tools in position for indexing and for interchangeable positioning on the base member of the present unit;

FIGURE 4 is a perspective view of the base portion of the present tool-holding unit;

FIGURE 9 is a top plan view of a modified form of tool-holder with cutter holders of an improved form for use particularly with the so-called "throw-away" type of cutting bit and illustrates the variety of cuts which can be made with one cutter;

FIGURE 10 is a perspective view of the modified form of tool-holder with the blades for the cutting tips omitted; and FIGURE 11 is an exploded view of the cutting bit holder and cutting bit of FIGURE 9 and on an enlarged scale.

Figure 5:
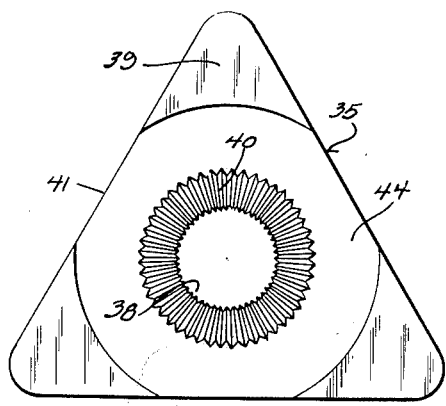
FIGURE 5 is a bottom plan view of the head member shown in FIGURE 3.

Generally, the present tool holder unit includes a base sub-assembly in which a circular plate-like portion has a hollow boss of frusto-conical form extending from one side of the plate, with a screw thread in the boss aperture and flutes formed on the conical external surface of the boss. A plate-like extension is formed on another side of the circular base plate, of a size to enter the neck of the usual T-slot on a machine tool carriage and with its center line on a diameter of the boss. And a plate is attached to the base extension to enter the body of the machine tool carriage T-slot and to co-act with the base plate in clamping the base in fixed position on the carriage.

An interchangeable head includes a block of generally triangular or generally rectangular form, with a conical aperture therethrough having flutes in the aperture wall for seating in the flutes of the base cone. A screw is rotatably mounted on the head block and extends into the conical aperture therein for engagement with the screw thread inside the base cone, to serve as a jack for raising the head from seated position on the base cone. Each side of the head block has channels at right angles to the common center line of the base and head members when assembled, and such channels have a number of screws for clamping one or more cutting tools into each channel.

The head block channels are located centrally of the altitude of the base boss and are of a width such that the channels leave substantial lengths of the fluted surfaces above and below opposite sides of the channels. The boss and head block are so proportioned that the total width of the fluted boss and block surfaces beyond opposite sides of the block channels are substantially equal to the width of the channels, which provides adequate masses of metal and best proportioning beyond the opposed channel sides for resisting cutting forces tending to push the tools out of their given position.

The circular base plate has a peripherally chamfered or convex surface and the bottom surface of the head block is somewhat concave so that the head member may be swiveled about the base when disengaged from the base flutes. An angular scale is formed on the chamfered surface of the base and co-acts with a reference mark on the head sides whereby the head may be seated in various positions and removed and returned to exactly any given prior position.

Referring to the drawings by numerals designating like parts, 12 designates the carriage of a lathe to move longitudinally of the lathe bed and which carries a cross-slide 13 on which is mounted a tool slide 14. The tool slide is provided with a T-slot for receiving a member 18 which is herein called a bar or "slot bar," and which is adjustably attached by screws 19 to the base member. The base member comprises a circular base plate 20 with a frusto-conical boss 21 extending from one side thereof and with the altitude (center line) of the cone perpendicular to surfaces 22 of the base plate and at the center of the base plate. The surfaces 22 are on both sides of an extension 23 from the other side of the base plate and which is of a size to extend through the neck of a tool slide T-slot, the extension having its center line on a diameter of the base plate 20. The adjacent longitudinal edges 24 and 25 of the slot bar 18 and the adjacent edges of the base extension 23, and the base plate surfaces 22, are parallel and form a neck extending from the T-slot so that the base is held in the tool slide in a given position when screws 19 are tightened to clamp the portions of the tool slide slot in the channel-like space formed by such surfaces. The base plate 20 has a peripheral chamfered or convex surface 27 on one side, on which is formed a scale 28 marking each 7.5° of a circle about the base plate. The base boss 21 has flutes 29 in its conical surface with each flute centered on one division of the scale 28.

Figure 6:
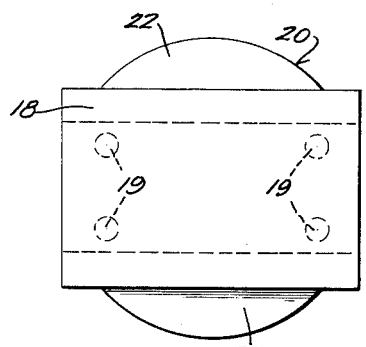
FIGURE 6 is a bottom plan view of the base portion of the present unit, shown in FIGURE 4.

It will be noted that the screws 19 are in pairs and are set as closely as possible to the periphery of the base plate 20 (see FIGURE 6) and the end of the slot bar 18 to provide two locations as far apart as possible for acting as a lever for resisting pressure on the tool 30 which tends to tip the tool and holder relative to the tool slide. The distance X (see FIGURE 4) from the tip of the tool to one set of screws 19 (acting as a fulcrum) indicates the lever arm tending to tip the tool and the distance Y between the two sets of screws 19 indicates the lever arm resisting the tipping of the cutting tools about the one set of screws as a fulcrum.

When the cutting tool is set into the holder, it extends outwardly from the holder beyond one set of the screws 19 for a sufficient distance to act on the workpiece without interference of the workpiece with the toolholder. Pressure on the tool acts through the lever arm X and is resisted by the lever arm Y. Assuming that the tool has been set into the holder with only such overhang as is usual in good machine shop practice, the lever arm X will be much shorter than the lever arm Y, so that the tool and holder cannot tip relative to each other or relative to the tool slide. The ideal situation is to have the lever arm X of minimum length and the lever Y of maximum length to obtain the greatest possible rigidity of the cutting tool and allow the maximum cutting speed of the carbide-tipped tools which are commonly used. The present construction provides the greatest possible difference between the two lever arms, consistent with obtaining the other advantages of the present unit.

Figure 8:
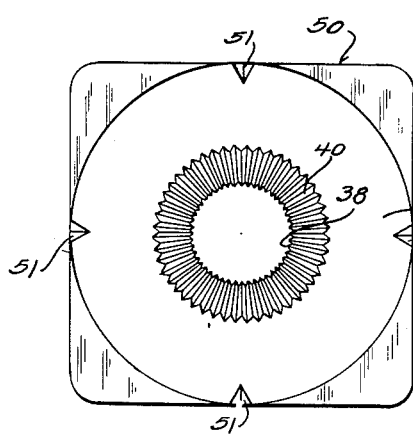
FIGURE 8 is a bottom plan view of a holder head member shown in FIGURE 7.
Figure 7:
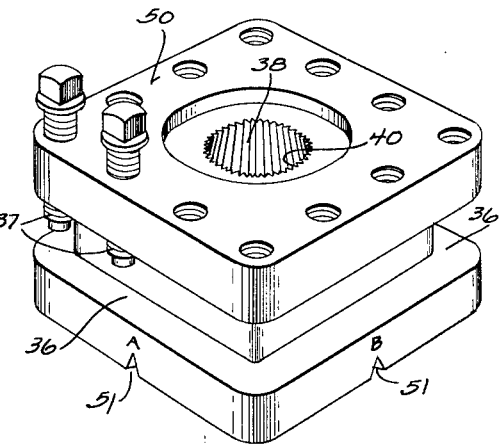
FIGURE 7 is a perspective view of a tool-holder head member of rectangular form for holding a greater number of tools than the triangular form previously illustrated.

An interchangeable head sub-assembly co-acts with the base sub-assembly and provides means for actually holding a number of tools which have been set for a sequence of cutting operations on a workpiece. Such head assembly may be either triangular as shown in FIGURES 2, 3 and 5 or rectangular as shown in FIGURES 7 and 8, the use of more than four sides having been found impractical. Generally, the two shapes of the head sub-assemblies are similar and the same reference numerals are applied excepting for parts having significant differences.

Referring to FIGURES 2, 3 and 5, a three-sided block 35 is provided with channels 36 in each side thereof longitudinally perpendicular to the center line of the block, for severally receiving the shank of a cutting tool and holding the tool by the clamping action of screws 37 thereon. Thus at least three tools may be set in the triangular head and at least four tools may be set in the rectangular head. Block 35 has a conical aperture 38 therethrough with its center line perpendicular to the plane of the bottom surfaces 39 of the block and with flutes 40 in the surface defining the conical portion of the aperture. Flutes 40 are shaped and placed to mesh with and seat in the base cone flutes 29 when the head is in position for a cutting operation. Portion 44 of the bottom of the block 35 is concave to conform with (but not to seat on) the substantially convex surface 27 of the base plate 20. Hence, portions of the bottom edge of the head block 35, have arcuate edges 41 closely adjacent the scale 28 on the base member and each side of such head block bears a reference line with different reference characters, such as A, B and C in the triangular block and A, B, C and D in the rectangular block, the reference lines being in planes through the center line of the assembled unit. In the use of the triangular block, the scale 28 extends beyond the arcuate head block edges 41 so that the reference lines A etc. terminate close to the scale and the seating of the tool-holder head on the base can be easily read.

A recess is formed in the top surface of the head block 35 to receive a disk 45 (see FIGURE 2) in which is rotably mounted a screw 46 of a size engageable with the screw threads of the base cone 21. A handle 47 is detachably secured to the end of the screw extending above its bearing disk to allow raising of the head member 35—41 from its seated position on the base cone and regardless of the tightness of such seating.

The rectangular head member 50 is similar to the triangular head member described above, other than in the duplication of some parts due to the greater number of sides and in requiring special provisions for the reference lines A through D. The sides of the rectangular head member substantially cover the scale 28 so that a triangular notch as shown at 51, is cut in at each side with one of its edges in a plane through the center line of the unit. The notches 51 are of sufficient size to bring the inner edge adjacent the scale markings for ease in reading the scale.

The modified head block 55 of FIGURES 9, 10 and 11 is generally similar to the triangular form of head block previously described but is made with six or more sides with shelves 56 extending from alternate head block sides. In the form shown, each shelf 56 is formed with three sets of serrations 57, 58, 59 all extending in the same direction perpendicular to the block surface at right angles to the top of the block shelves. Above each shelf, the head block is slotted as indicated at 60 for receiving a transparent guard against flying chips and splashing coolant. Each shelf has a tapped hole 61 into which a screw is to be threaded for holding other parts on the shelves.

A bit-holder may be mounted on each of the shelves and each bit-holder comprises a holder block 65 generally of the shape of the shelves and formed with a seat 66 therein which as herein shown, is for insertion of a triangular cutting tip 67 of a sintered carbide which provides six edges available successively for cutting. The cutting inserts may be square or other shapes with a number of sides dependent on the number of cutting edges desired and shaped dependent on the particular work to be done. The seats 66 are preferably pressed into the holder blocks 65 to increase the density of the metal forming the seat and to provide smooth seating and back-up surfaces for the cutter tips.

Each holder block 65 is formed with one side 69 serrated to conform to the serrations in a shelf 56 so that the block is always seated in exactly the same position on the tool-holder and the serrations help to hold the block against movement from that position. Another side of each holder block 65 has a set of serrations 70 which are perpendicular to the edge of the seat 66 adjacent to the cutting edge of the insert 67, and each block is provided with a hole 71 registering with the hole 61 in its shelf 56 when the holder block 55 is seated with one side in contact with the upwardly extending mass of the head block.

A generally plate-like clamp 74 has an outline similar to that of the holder block shelf and has a serrated heel 75 on one side for seating in the serrations 70 of the holder block. The clamp has an elongated hole 76 with its axis parallel with the length of the serrations 75 and so placed as to register with the hole 71 in the holder block 55 when the serrations 70 and 75 are engaged. A portion 77 of one edge of the clamp 74 is formed at an angle such that its leading edge is adjacent the cutter bit to form a breaker for chips cut by the bit 67 and an area 78 forms a toe bearing on bit 67 when heel 75 is seated in serrations 70. Each bit holder being generally of the shape of the holder block shelf and each clamp being of the outline of a holder block shelf, the bit holder and clamp are co-extensive in area and which area is equal to that of a shelf.

A screw 80 has a relatively large square head 81 and a flange 82 spans the clamp hole 76, the screw thread below the flange being of a size to pass with relatively close fit through the holder block hole 71 and to thread into the shelf hole 61. If it is desired to change the chip breaking action of the clamp edge 77, the screw 80 is loosened and the clamp is advanced toward or retracted from the cutting edge of the tip 67, the clamp sliding in engaged serrations 70 and 75 while the position of the screw 80 in the clamp hole 76 also changes. The clamp 74 bears on holder 65 only at its serrated heel 75 and at its toe 78 which is of a size and shape to bear on the cutting insert 67 while the screw 80 bears centrally on the clamp. All clamping pressure is therefore concentrated on two relatively small areas and keeps the cutting tip 67 well seated even in heavy cutting.

In FIGS. 9 and 10 the handle 47 is pivoted to screw 46 and a helical compression spring seats in the recess in the top of the boss 21 and in a cavity in the extension 85 from head plate 86 fastened to the head block 55. Thus, the head block is cammed in place on the base boss by the handle 47 acting on the extension 85 and is lifted off the boss by the spring, sufficiently to allow quick rotation of the head block to any desired position on the scale 28.

It will be obvious that the present form of head block and bit-holder provides clear vision of the cutting edge from farther back from such edge than the tool-holders previously described so that the user no longer has to lean over the lathe. The present form of head block and bit-holder also eliminates many of the screws 37 and entirely eliminates any exposed screw threaded portions so that there is no longer a tendency for tangling or packing chips about such screws as was the case with the holders previously used for that purpose and provides more durable and expeditious means for re-setting a cutting tip than is the case with holders now on the market for "throw-away" cutting tips. Greater rigidity and proper setting of tools reduces tool damage and gives more effective and economic use of throw-away bits.

The present tool-holder provides structure by each of which several tools thereon may be indexed to various positions and returned exactly to any prior position without affecting the rigidity with which each tool is held. Hence, a number of tools may be semi-permanently mounted on each head block and successively or alternately brought into use with the minimum loss of time. The tools may thus be carefully set in the holder at exactly the correct position for each tool, which requires the knowledge and skill of a first-class machinist, rather than leaving such setting of tools to the inferior judgment of persons usually defined as machine operators. Such pre-set holders and tools are then issued from the tool room with confidence that the tool setting is correct both from the viewpoint of proper cutting and avoiding unnecessary damage to the tool.

Leverage ratios are obtained (see FIG. 4) which are more favorable to tool rigidity and to the best usage of the tools than is true with known tool-holders. The maximum difference is obtained between the lever arm from the cutting edge of the tool to a fulcrum about which the tool tends to tip, and the lever arm from such fulcrum to a point or points which resists the tendency of the tool to tip relaive to the tool slide of the machine tool.

The tool-head has forty-eight positions varying by 7½° so that a single tool has a work latitude otherwise obtainable only by a number of tools. Thus the single bit of FIG. 11 is used to cut all the shoulders and all the chamfers shown on the workpiece 90 in FIG. 9, which are at 7½°, 15°, 22½°, 30°, 37½°, 45° and 90° from left hand end of the workpiece. A single sharpening of a tool such as shown in FIG. 1 and its re-setting in the holder or re-setting of the bit of FIG. 11 is thus the equivalent of sharpening and re-setting all of the tools heretofore required for all the cutting operations shown in FIG. 9. The tool-head is so proportioned as to place the mass of metal to the best advantage in the work load area and the head block accordingly has the minimum weight for a required rigidity.

In the triangular form shown in FIGS. 9–11, the load on the tool shelf is only that of the cut; whereas, the load on the tool shelf in the other type of tool-holders shown, is the cutting load plus the load imparted by various screws and clamping devices and the clamping load totals several times that of the cutting load and varies with the judgment of the operator doing the clamping. Also for the structure shown in FIGS. 9–11 there is greater facility of tool setting and better chip clearance than in the other forms shown, as the bit is gripped close to its cutter edge while giving greater chip freedom between the holder head and the workpiece than in the holder forms previously described. In FIGS. 9–11 there is better visibility of the cutting edge from a safe angle and from a less fatiguing position for the operator than heretofore. There are no screws or other surfaces on which chips may be entangled and packed, which causes loss of time in clearing the tool. The bit-holder and its clamp must always be set in the same position, which eliminates a tendency of operators to extend the tool-holder too far from the tool-head or to use shims improperly, all resulting from the usual haste of the operator to reduce the non-working time of a machine while tools are being changed.

This is a continuation-in-part of S.N. 654,830, filed April 24, 1957, now abandoned.,

I claim:

1. A holder for adjustable mounting on the tool slide of a lathe for receiving a plurality of cutting tools and comprising a base member having a circular plate portion with a conical fluted boss extending from one side thereof and having a threaded aperture centrally of the boss, a bar attached to the other side of the base plate for co-action therewith in engaging in a T-slot in the lathe slide, the bar having a neck portion extending from and fitted into the tool slide groove for holding the bar and base member against rotation relative to the tool slide, a head block with conical fluted aperture centrally therethrough for engagement with the base member boss, the head block having plural channels in the sides thereof for severally receiving the cutting tools, multiple screws clamping the tools severally in the channels, and a screw threaded into the aperture in the base boss and engageable with the head block for lifting the head block flutes free from the base cone flutes.

2. The lathe tool holder of claim 1 in which the flutes on the conical boss and conical aperture are each V-shaped with the apex of each flute spaced 7.5° around the conical boss and aperture from adjacent flutes thereon for placing and replacing the head block in position on the base member boss.

3. The lathe tool holder of claim 1 in which the flutes on the base boss and on the head block aperture are uninterrupted and engage in one another from above to below the channels in the head block for spreading cutting load transmitted from a tool over the entire area of engaged flutes opposite the tool.

References Cited in the file of this patent

UNITED STATES PATENTS

| | | |
|---|---|---|
| 764,466 | Henry | July 5, 1904 |
| 1,236,200 | Miller | Aug. 7, 1917 |
| 2,366,079 | Wilson | Dec. 26, 1944 |
| 2,833,183 | Zierden | May 6, 1958 |